April 26, 1955 B. McADAMS 2,707,211

ADAPTER CIRCUIT

Filed March 30, 1951 2 Sheets-Sheet 1

INVENTOR
BRUCE McADAMS
BY Robert Harding Jr.
ATTORNEY

INVENTOR
BRUCE McADAMS
BY Robert Harding Jr.
ATTORNEY

United States Patent Office 2,707,211

Patented Apr. 26, 1955

2,707,211

ADAPTER CIRCUIT

Bruce McAdams, North Arlington, N. J., assignor to International Telephone and Telegraph Corporation, a corporation of Maryland Application March 30, 1951, Serial No. 218,459

10 Claims. (Cl. 179—16)

The present invention relates to telephone communication circuits and more particularly to a circuit for connecting automatic telephone exchanges of a composite dialing system to a conventional carrier system to permit two-way dialing via the carrier system.

In the past, when it was desired to transmit dialing information of a composite dialing system via a carrier, it was necessary to provide an operator at each end of the carrier to translate dialing signals into signals suitable for transmission over the carrier and to retranslate the received carrier signals into the original dialing signals. This is because normal dialing signals in a telephone trunk circuit consist of alternations between ground potential and a D. C. battery potential on a metallic line, while supervisory signals are transmitted over a carrier in the form of A. C. pulses produced by an oscillator controlled by an open or closed condition on a supervisory lead. It is contemplated by the present invention to provide means whereby the conventional dialing signals of a composite dialing system may be automatically translated into signals suitable for transmission over a carrier system and vice-versa.

It is, therefore, an object of the present invention to provide a novel circuit for interconnecting a conventional telephone circuit of a composite dialing system with a conventional carrier whereby two-way composite dialing may be effected.

Another object of the invention is to provide a novel and simple circuit for translating D. C. composite dialing supervisory signals into corresponding supervisory signals of a carrier system.

It is another object to provide a novel and simple circuit for translating supervisory signals received from a carrier system into corresponding dialing signals of a composite dialing system.

It is still another object to provide a novel and simple circuit means whereby a conventional carrier circuit may form a link in an automatic composite dialing telephone system.

The foregoing and other objects and advantages will appear more fully hereinafter from a consideration of the detailed description which follows, taken together with the accompanying drawings, wherein one embodiment of the invention is illustrated by way of example. It is to be expressly understood, however, that the drawings are for the purpose of illustration only and are not to be construed as defining the limits of the invention.

In the drawings, wherein like reference characters designate like parts throughout the several figures.

Figure 1:
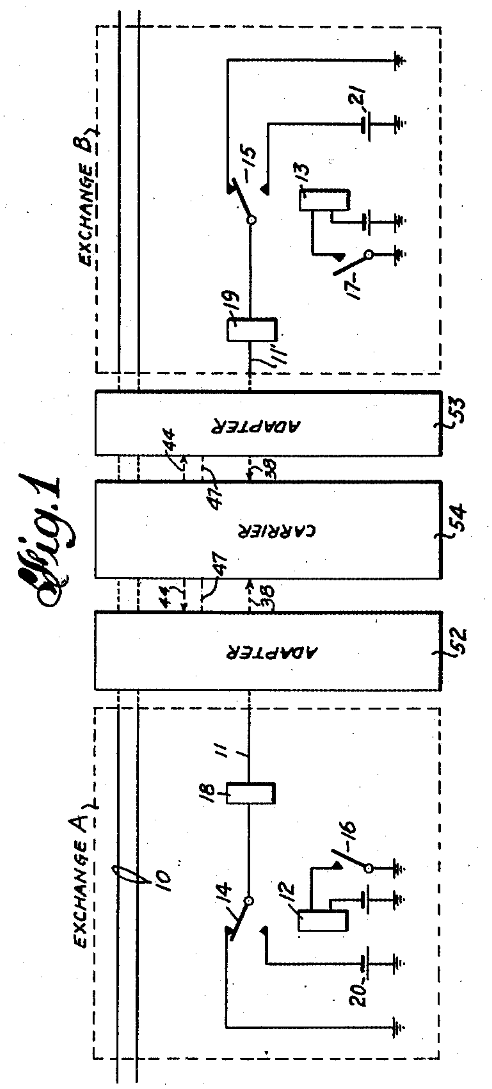
Fig. 1 is a schematic diagram of the relevant elements of two interconnected exchanges of a conventional composite dialing telephone system.

For a better understanding of the various aspects of the invention reference is had to Fig. 1, wherein exchanges A and B are shown as being interconnected by conductors 10, which for the sake of convenience, may be termed the talking conductors, together with the supervisory or dial lead 11, 11' for transmitting the dial signals. The exchanges may be local exchanges connected directly to subscribers or they may be intermediate or district exchanges. Inasmuch as the principle of operation will be the same, the invention will be described only as being applied to a pair of local exchanges A and B having supervisory transmitting relays 12 and 13 controlling contacts 14 and 15, respectively. Relays 12 and 13 are shown as being controlled by switches 16 and 17, respectively, opened and closed in accordance with the opening and closing of the dial circuits of the associated subscribers' lines. It will be noted that when both subscribers' lines are idle, dial leads 11 and 11' are grounded at both ends through contacts 14 and 15, back. Supervisory receiving relays 18 and 19 in exchanges A and B respectively serve to perform various functions thereat in response to the condition of the dial lead, but as this forms no part of the present invention, the control circuits operated thereby have been omitted for the sake of clarity.

The various conditions of dial leads 11 and 11' in a composite dialing system are as follows:

1. Idle subscriber's line at each end.
   The ends of both dial leads will be grounded, as indicated in Fig. 1.
2. Seizure of line by subscriber at exchange A.
   Relay 12 will be operated by the closure of switch 16 and battery 20 will be connected to the dial lead 11 through contacts 14 front.
3. Seizure of line at exchange A with exchange B signalling "stop dial."
   To effect the "stop dial" signal, relay 13 at exchange B is operated through closure of switch 17 to connect battery 21 to dial lead 11' through contacts 15 front, so that like battery potential will be connected to both ends of the dial lead 11', so as to release relay 19.
4. After condition 3, with exchange B signalling "start dial."
   This is done by releasing relay 13 to re-connect ground to the dial lead through contacts 15 back.
5. Seizure of the dial lead at exchange A with exchange B signalling "busy condition" of the subscriber thereat.
   In this condition battery potential will be connected to the dial lead 11 at exchange A, as described above, and relay 13 will be alternately energized and de-energized by means not shown to place ground and battery potential alternately on the dial lead 11' at exchange B.
6. Talking condition established on conductors 10.
   This condition is established when relay 13 energizes at exchange B after condition 4 above, when a talking connection has been established to the subscriber at exchange B. The operation of relay 13 re-applies a negative potential from battery 21 and again causes relay 19 to release.
7. Either subscriber releases his circuit.
   When either subscriber releases his circuit by hanging up the receiver, the corresponding relay 12 or 13 will be released, so as to re-place ground on the dial lead at the releasing end, and after both subscribers hang up ground is re-applied to both ends of the dial lead 11 again causing relays 18 and 19 to drop.

Figure 2:
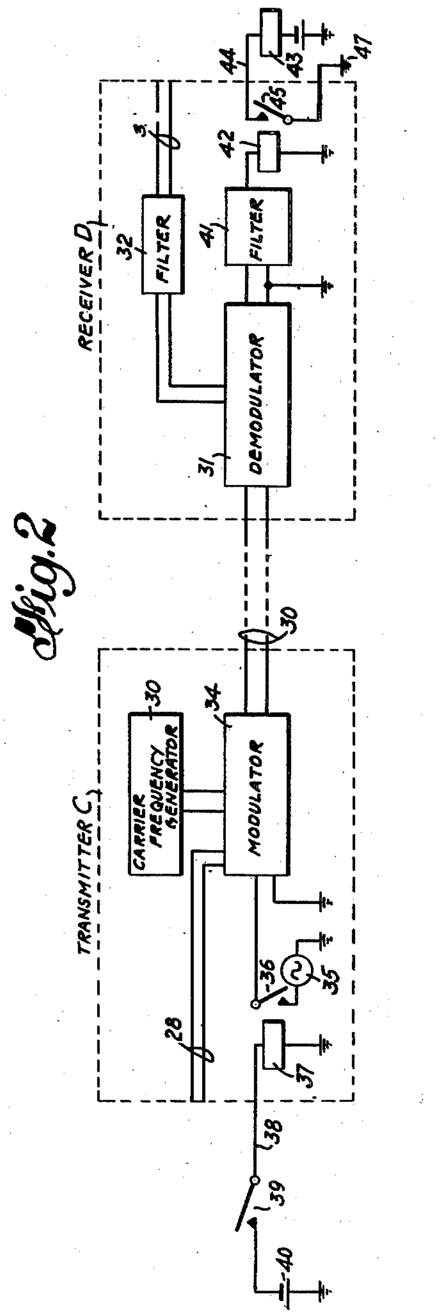
Fig. 2 is a schematic diagram of the relevant elements of a conventional carrier system.

Fig. 2 illustrates schematically the pertinent elements in a carrier transmitting station C and receiving station D, it being understood that both stations normally are provided with both receiving and transmitting equipment for two-way communication therebetween. Audio frequency talking current is applied across input terminals 28 and modulates a carrier supplied from the source of carrier current 30 of transmitting station C. The received modulated carrier current is demodulated in demodulator 31 in receiving station D and is filtered by an audio frequency band-pass filter 32 and applied to output terminals 33. Supervisory signals are supplied by signal generator 35 and the connection thereof to the modulator is controlled by contacts 36 of supervisory relay 37. The operation of relay 37 is controlled over supervisory lead 38 by a switch 39 connected to a source of operating potential such as a battery 40. Filter 41 at the receiving station D is tuned to the supervisory signal frequency and has its output connected to a signal receiving relay 42. The receiving relay is arranged to operate receiving supervisory relay 43 over supervisory lead 44 through contacts 45. Contacts 45 are connected to ground potential over a lead 47. It will be noted that the transmitting supervisory relay 37 is operated through open and D. C. potential condition on the supervisory lead 38, and that signal receiving relay 42 causes an open or ground potential condition to be placed on supervisory lead 44.

If now it is desired to interconnect exchanges A and B of Fig. 1 and to afford supervisory communication therebetween by way of two-way composite dialing over a carrier system, such as illustrated in Fig. 2, it will be necessary to provide an adapter circuit at each end of the carrier system.

Figure 3:
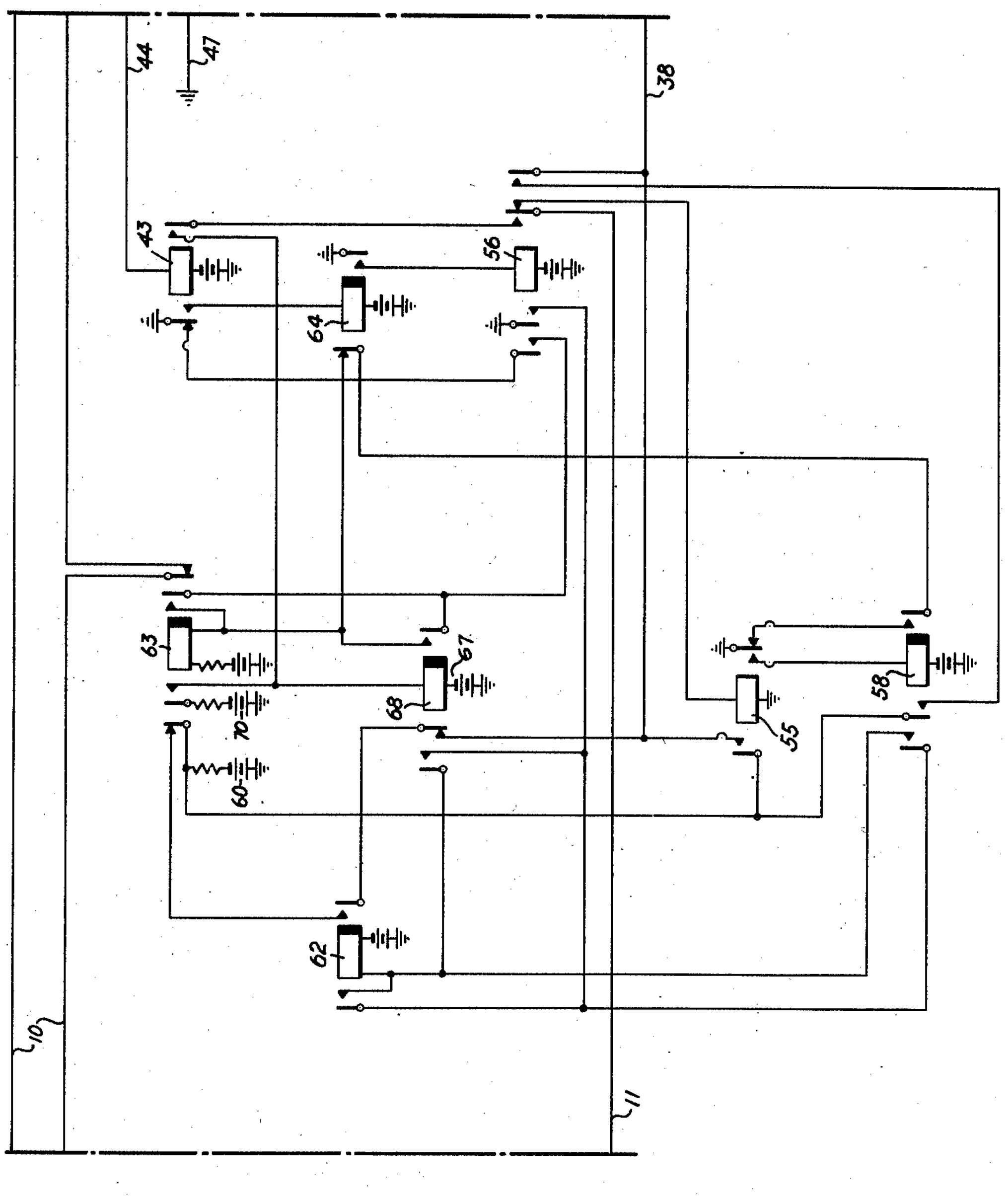
Fig. 3 is a circuit diagram of an adapter circuit according to the invention for permitting two way dialing between the exchanges of Fig. 1 via a carrier system as shown in Fig. 2.

An embodiment of such an adapter circuit in accordance with the present invention is diagrammatically illustrated in Fig. 3. In a complete system, an adapter circuit will be located within each of the enclosures 52 and 53 of Fig. 1 at either end of a carrier system located within the enclosure 54. The carrier system, as has been pointed out above will consist of a transmitter C to transmit signals originating in exchange A, a receiver D adjacent exchange B for receiving said transmitted signals, a second transmitter C for transmitting signals originating at exchange B, and a second receiver D adjacent exchange A for receiving said signals.

The dial lead 11 from exchange A is normally connected to the operating winding of stepping relay 55 in the adapter 52 over inner right break contacts of relay 56. If battery potential is placed on dial lead 11 of Fig. 3 by the operation of relay 12 of Fig. 1, caused either by a subscriber connected to exchange A removing his receiver from the receiver hook or by the connection of a subscriber's line with the exchange, such as by dialing in a well known manner, the identifying number or letter of the exchange, relay 55 will operate over inner right break contacts of relay 56 and will cause the operation of relay 58 over its right make contacts. Relay 18 will also operate. Resistance battery 60 will be connected to lead 38 over left make contacts of relay 55 to operate signal transmitting relay 37 of its associated transmitter C of Fig. 2 to cause a modulated signal to be transmitted over the carrier system to operate relay 42 of receiver D, associated wtih exchange B, thereby placing ground on wire 44, as explained above. The manner in which this will place a negative potential on the dial lead of the called exchange will later be explained in terms of a signal being applied to the circuit of Fig. 3 from the carrier.

If exchange B is not ready to receive the dial pulses, it will transmit a "stop dial" signal by operating relay 13 in a well known manner, to connect battery 21 to dial lead 11′ thereat. This condition will be transmitted over adapter circuit 53, as explained above in connection with the operation of adapter circuit 52, and will cause ground to be placed on conductor 44 by the connection thereof to grounded lead 47 through contacts 45 of the carrier receiving station D associated with exchange A. This will cause relay 43 of adapter 52 to operate and in turn cause the operation of relay 64 from ground over left make contacts of relay 43. Operation of relay 64 will in turn cause relay 56 to operate from ground over right make contacts of relay 64.

Dial lead 11 will now be connected to a source of potential 67 in adapter 52 over inner right make contacts of relay 56 and right make contacts of relay 43 and operating winding of relay 68. Relay 68 will remain deenergized because the other end of the dial lead is connected to a source of potential at the exchange A. Also relay 18 will be released to tell exchange A that exchange B is not ready.

Operation of relay 56 at adapter 52 will cause operation of relay 62 from ground, inner left make contacts of relay 56, outer left make contacts of relay 68 and the operating winding of relay 62 and will open the operating circuit of relay 55 at its inner right break contacts. Operation of relay 56 closes a second circuit from lead 38 to resistance battery 60 over outer right make contacts of relay 56 and inner left make contacts of relay 58 to maintain the battery connection to lead 38 after relay 55 releases. The release of relay 55 will open the energizing circuit for relay 58. Relay 58 is of the slow release type so that relay 62 will have time to operate before relay 58 releases to close a holding circuit over its left make contacts. Relay 62 will transfer the connection of lead 38 to battery 60 by its right make contact to the inner left break contacts of relay 68 and the outer left break contacts of relay 63.

When exchange B is ready to receive dial pulses it will transmit a "start dial" signal in a well known manner, which as above explained, will be effected by releasing relay 13 of Fig. 1 to connect ground to dial lead 11′ over break contact 15. The resulting discontinuance of the signal transmitted over the carrier system will cause relay 43 of adapter 52 to release and in turn release relays 64, 56 and 62. Relay 56 will transfer the dial lead 11 back to the operating winding of relay 55 through inner right hand break contact of relay 56. Relay 55 will operate and will connect lead 38 to resistance battery 60 through its left make contacts. Relay 62 is of the slow release type so that relay 55 may establish the battery connection to lead 38 before relay 62 breaks the previously established connection through its right make contact. Relay 58 operates. The connection of ground to dial lead 11 through the operating winding of relay 55 and the consequent operation of relay 18 serves as the "start dial" signal to exchange A.

When now dial pulses are received over dial lead 11 from exchange A, relay 55 of adapter 52 will operate in response thereto to establish the required alternate open and D. C. potential condition on lead 38 through the operation of its left hand contacts. Relay 63 operates on the first dial pulse from ground through right hand break contact of relay 55, right hand make contact of relay 58, left hand break contact of relay 64 and operating winding of relay 63. Relays 63 and 58 are of the slow release type and will remain operated during the transmission of the dial pulses. Relay 63 opens the talking conductors 10 during transmission of dial pulses in order to prevent objectionable pulses from being fed back into the talking conductors through the hybrid coil in the carrier input.

The dial pulses on lead 38 of adapter 52 will be transmitted over the carrier system and received by the receiver D associated with the exchange B and will cause relay 43 of adapter 53 to follow the dial pulses. The circuit operating relay 19 will thus be intermittently opened and closed, causing relay 19 also to follow the dial pulses and transmit them in a known manner to exchange B for selecting the called line.

When the called subscriber answers, relay 13 of Fig. 1 is operated in a well known manner to connect battery 21 to the dial lead 11′ through make contact 15 which will cause a signal to be transmitted in the manner described from adapter 53 over the carrier system to operate relay 43 of adapter 52 as well as relays 64, 56 and 62 as explained above. Relay 68 will be connected to the dial lead 11 through right make contact of relay 43 and inner right make contact of relay 56 to provide supervision to the calling exchange.

If the calling subscriber releases first, the dial lead 11 will be connected to ground and relay 68 of adapter 52 will operate. This will open the circuit from resistance battery 60 to lead 38 at the inner left break contact of relay 68 and will provide the "disconnect" signal to the receiving end associated with exchange B. Operation of relay 68 in adapter 52 will prepare an operating circuit for relay 63 from the operating winding thereof through right make contact of relay 68, outer left make contact of relay 56, to left hand contact of relay 43. When the called subscriber releases, the ground is removed from lead 44 of adapter 52 and relay 63 is operated through left hand break contact of relay 43 and opens the battery connection from the dial lead 11 to the battery 60 by opening the circuit at the outer left break contact of relay 63 to prevent the sending of a false signal to the distant end when relay 68 releases. Relays 64, 56, 62 and 63 of adapter 52 release in that order to free the circuit.

If the called subscriber releases first after a connection has been completed, relays 43, 64, 56 and 62 of adapter 52 release in succession, as described above, and the dial lead 11 will be connected to ground through inner right break contacts of relay 56 and the operating winding of relay 55. Relay 55 operates to connect battery 60 to lead 38 over the left make contacts of the relay before slow release relay 62 has had time to break the battery connection to lead 38 over its right make contact. When the calling party releases, ground potential is placed on the dial lead 11 to release relay 55. The release of relay 55 disconnects the battery from lead 38 to transmit a "disconnect" signal to the called end.

A call from the carrier is signalled by the operation of relay 43 of the adapter at the receiving end, as described above. Relays 64 and 56 of that adapter operate in turn. The operation of relay 56 transfers the connection of the associated dial lead from the operating winding 55 to battery 67 via the operating winding of relay 68, right make contact of relay 43 and inner right make contact of relay 56. Relay 68 operates through the ground connection of the dial lead in the called exchange and completes an operating circuit for relay 62 as follows: ground, inner left make contact of relay 56, outer left make contact of relay 68, operating winding of relay 62 and battery. Relay 62 locks under control of relay 56 over its left make contact.

When the called exchange A signals "stop dial," a D. C. potential will be placed on the dial lead, as explained above, and will cause relay 68 to release. Battery 60 will be connected to the supervisory lead 38 over outer left break contact of relay 63, right make contact of relay 62 and inner left break contact of relay 68 to signal the "stop dial" condition of the called exchange to the calling exchange via the carrier system. When the called exchange is ready to receive the dial pulses it will again place ground potential on the dial lead 11 to cause relay 68 to operate and break the battery connection to the supervisory lead 38 to send a "start dial" signal to the distant end.

When now the calling exchange B transmits dial pulses, relay 43 of adapter 52 will repeat those pulses to the dial lead by interrupting the battery connection via its right contact and will simultaneously cause relay 63 to operate by the first dial pulse of a series of pulses representing a digit through the circuit, ground, left break contact of relay 43, outer left make contact of relay 56 and right make contact of relay 68. Relay 63 will lock over its inner right hand make contact to render it independent of operation of relay 68 to open the talking circuit over its outer right hand break contact during the dialing of each digit to prevent undesirable feedbacks through the hybrid coil in the carrier system.

Relay 64 is of the slow releasing type and will hold during each series of pulses. Relay 68 will be held in released condition during each series of pulses by the connection thereof to a battery 70 through inner left make contacts of relay 63 to prevent transmission of pulses back over lead 38.

If the called subscriber's line is busy, a battery and ground connection will alternately be placed on the dial lead of the called subscriber's exchange, as described above, and cause relay 68 in the adapter associated with that exchange to flash. This will cause periodic interruption of the battery connection to the supervisory lead 38 through its inner left hand break contact and will cause a "busy" signal to be sent to the calling end.

When the called party answers by lifting his receiver, battery will be connected to the dial lead 11 to release relay 68 to establish the battery connection to lead 38, thereby indicating to the calling end that the called party is connected to the line and that the talking circuits are connected.

While the principles of the invention have been described in connection with specific apparatus, it is to be clearly understood that this description is made only by way of example and not as a limitation to the scope of the invention.

What is claimed is:

1. An adapter circuit for establishing a connection between a telephone trunk circuit and a carrier system, comprising a pair of sources of potential, a first terminal for connection with a telephone trunk circuit dial lead, a second terminal for connection with a supervisory input lead of said carrier system and a third terminal for connection to a supervisory output lead of said carrier system, means responsive to a change of potential on said first terminal for connecting a first of said sources of potential to said second terminal, and means operative in response to a change in potential on said third terminal for disconnecting said first named means from said first terminal and for connecting said first terminal to a second of said sources of potential.

2. An adapter circuit, according to claim 1, and which further comprises means responsive to a difference in electrical potential between said second source of potential connected to said first terminal and the potential applied to said first terminal from said telephone trunk circuit dial lead for disconnecting said first source connected to said second terminal from said second terminal.

3. An adapter circuit, according to claim 1, in which said last named means includes means operative to establish a second connection between said second terminal and said first source of potential connected thereto independent of said first named means.

4. An adapter circuit, according to claim 3, in which said last-named means includes means operated by said last-named means for de-energizing said first-named means and which further comprises delay means also operated by said last named means for maintaining a connection between said second terminal and said first source of potential connected thereto for a period of time sufficient to enable said means operative to establish a second connection to establish said connection after said first named means is de-energized.

5. An adapter circuit comprising a first source of potential, a first set of terminals for connection to talking conductors of a telephone trunk circuit, a second set of terminals for connection to talking conductors of a carrier system and means for establishing connection between terminals of said first set and said second set, a first terminal for connection to the dial lead of said telephone trunk circuit, a second terminal for connection to an input supervisory lead of said carrier system, a third terminal for connection to an output supervisory lead of the carrier system, means establishing an open condition on said second terminal when a ground potential is applied to said first terminal, and means connected to said first terminal and operative in response to an electrical potential applied to said first terminal establishing a connection between said first source of electrical potential and said second terminal.

6. An adapter circuit, according to claim 5, and which further comprises a second source of potential, and means operative in response to a ground potential being applied to said third terminal for disconnecting said first named means from said first terminal and connecting said first terminal to said second source of electrical potential.

7. An adapter circuit, according to claim 5, and which further comprises connecting means connected to said third terminal and intermittently operative in response to alternate ground potential and open condition applied to said third terminal for periodically connecting said second source of potential to said first terminal, delay means connected to said connecting maens and operated thereby and adapted to remain in operated condition for a predetermined time after the release of said connecting means, whereby said delay means will remain operated during the intermittent operation of said connecting means, means adapted to operate when said connecting means is in unoperated condition and said delay means is in operated condition to open said talking conductor connection means, and means for delaying the release of said opening means, whereby said talking conductor connection means will open when the first open condition is applied to said third terminal and will remain open during a period of successive alterations of ground and open condition applied to said third terminal.

8. An adapter circuit for connection between a telephone trunk circuit and a carrier system comprising a pair of sources of potential, a first terminal for connection with a dial lead of said telephone trunk circuit, a second terminal for connection with the input supervisory lead of a carrier system, a third terminal for connection with said output supervisory lead of said carrier system, means responsive to a change in electrical potential on said dial lead for connecting a first of said sources of potential to said second terminal, said means connected to the input supervisory lead of said carrier system, and circuit means connected to said third terminal and responsive to supervisory signals received over said carrier system including means rendering said first named means ineffective and connecting said dial lead to a second of said sources of potential.

9. An adapter circuit, according to claim 8, which further comprises a first pair of talking conductors associated with said trunk circuit, a second pair of talking conductors associated with said carrier system, normally closed contacts connecting said first pair of talking conductors with said second pair of talking conductors of said carrier system, means operative in response to a subsequent short interruption of said supervisory signals opening said contacts, and holding means for said last named means maintaining said contacts in open condition during a subsequent series of alternations between received signals and interruptions constituting dial pulses of a single digit.

10. An adapter circuit, according to claim 8, which further comprises means maintaining said first named means ineffective during short interruptions of received supervisory signals.

References Cited in the file of this patent

UNITED STATES PATENTS 2,040,637 Wicks ---------------- May 12, 1936